Sept. 24, 1935.　　　E. F. MEER　　　2,015,455
APPARATUS FOR PACKING FRUIT
Original Filed June 24, 1929　　2 Sheets-Sheet 2
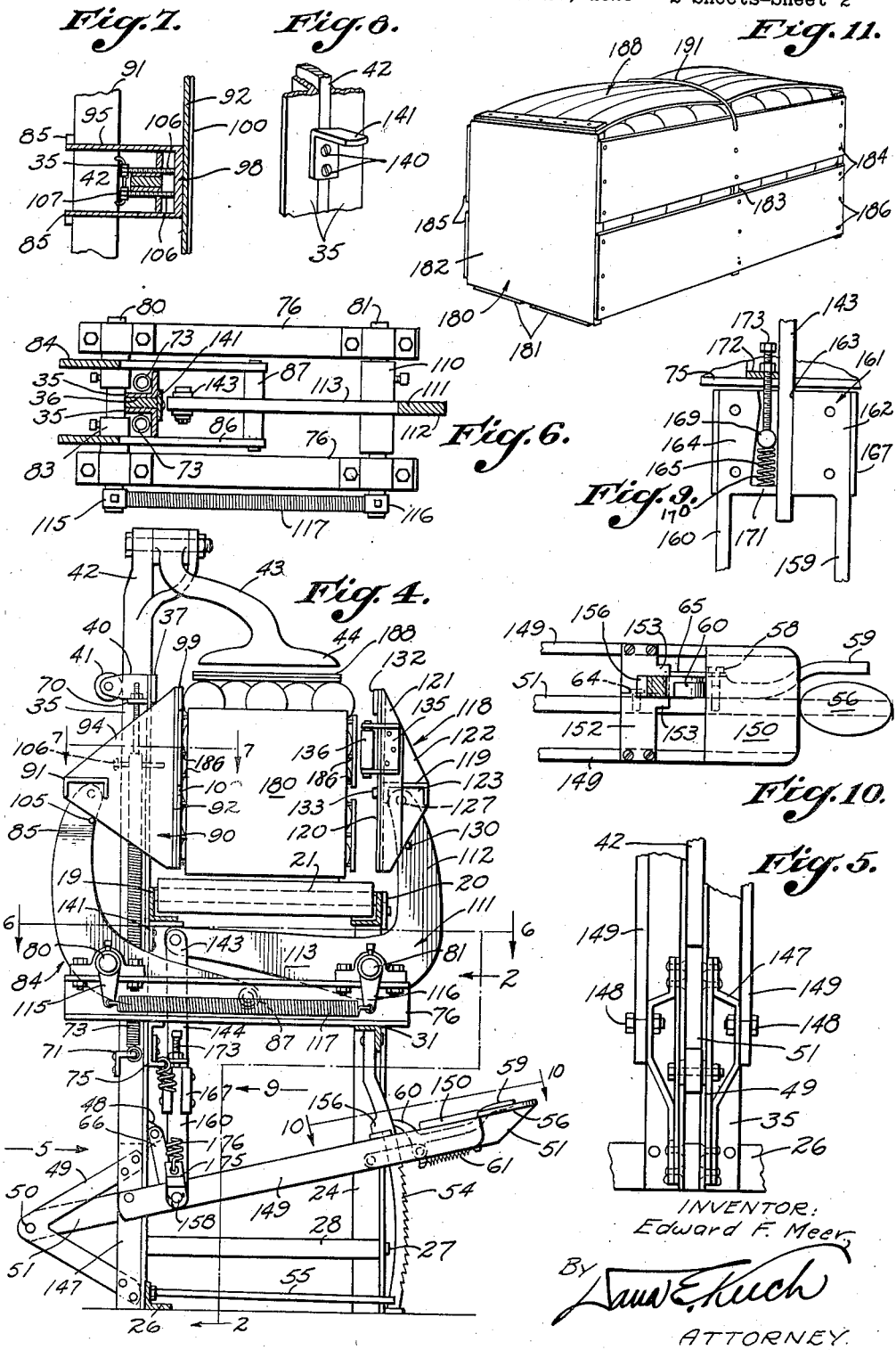
INVENTOR:
Edward F. Meer
ATTORNEY Patented Sept. 24, 1935

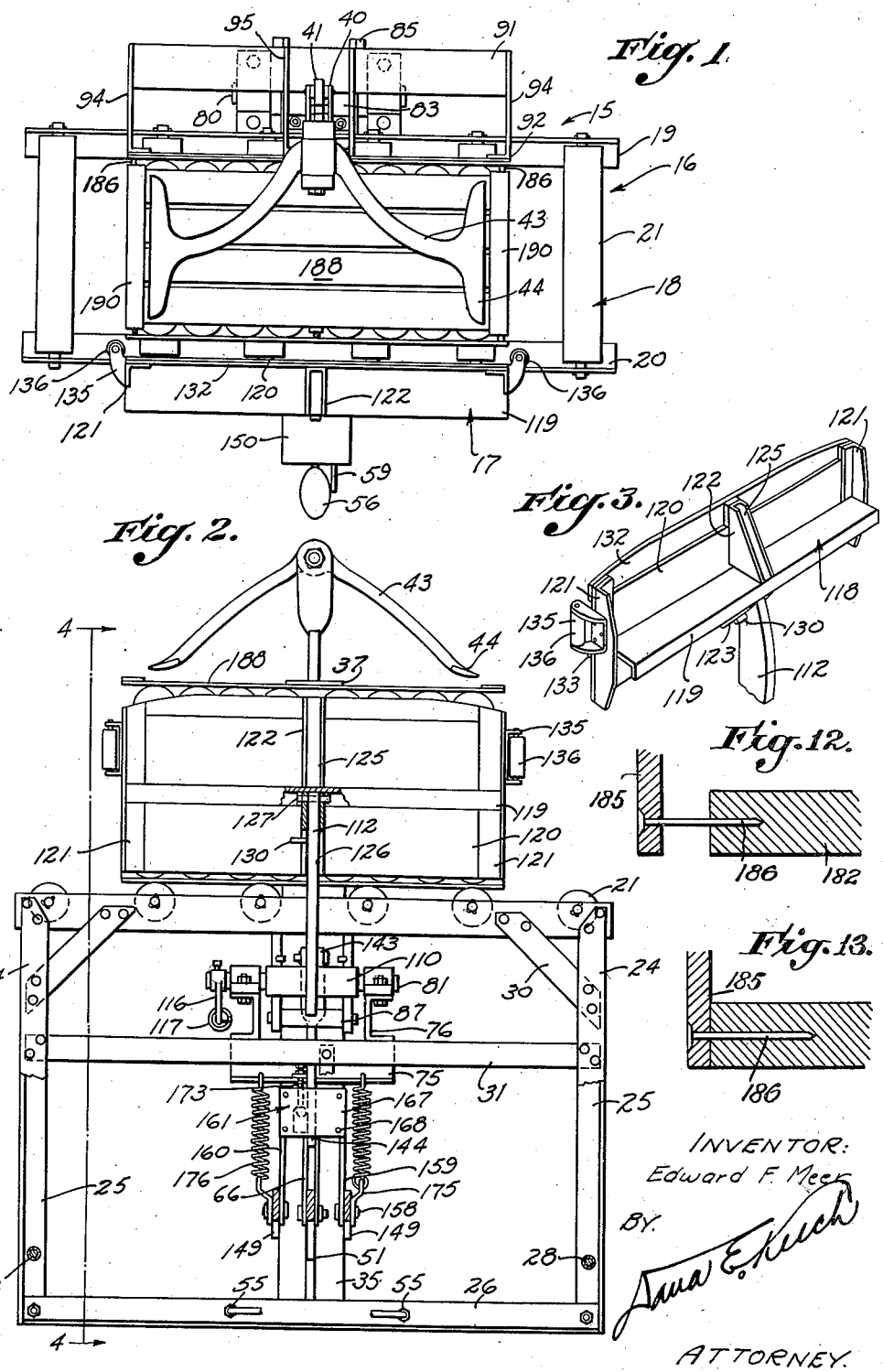

2,015,455

UNITED STATES PATENT OFFICE 2,015,455

APPARATUS FOR PACKING FRUIT

Edward F. Meer, Monrovia, Calif.

Original application June 24, 1929, Serial No. 373,098. Divided and this application May 18, 1931, Serial No. 538,174

11 Claims. (Cl. 100—57)

This invention relates to an apparatus for pressing covers onto boxes preparatory to securing same thereto, and it particularly relates to devices for pressing covers onto boxes where the box is filled in such a manner that the contents extend above the upper end of the box.

The preferred form of my invention shown herein was originally disclosed in my co-pending application for U. S. Patent, serial No. 373,098, filed June 24, 1929, now Patent No. 1,829,230, dated October 27, 1931, on a Method of packing fruit. This case is a division of that application, and the apparatus shown herein while adaptable for many different purposes with slight modifications, was particularly designed for carrying out the fruit packing method disclosed in the above noted co-pending application.

In the above mentioned method a fruit shipping case is made up with the sides spaced from the ends and the partition of the box, the nails for securing the sides to the ends of the partitions being only partially driven into the latter. With the box thus made up, fruit is packed therein so that it extends above the top of the box to form what is called a "crown pack". In carrying out the method, it is necessary to press in the sides of the box to the normal position relative to the ends and the partition thereof and concurrently to press the cover down on the box. In carrying out this method, as well as in the lidding of a fruit shipping box by the ordinary method, I have found that there is a tendency for the cover coming down on the side tiers of fruit thereof to cut the fruit against the upper edges of the sides of the box.

It is accordingly an object of my invention to provide a cover press having means for preventing the fruit being caught between the cover and the sides of the box when the cover is depressed into lidding position.

It is another object of my invention to provide a cover press in which means are provided for automatically tucking fruit inside of an upper edge of a box side when a cover is pressed downwardly onto the fruit in the box.

The manner of accomplishing the foregoing objects as well as further objects and advantages will be made apparent in the following description and in the accompanying drawings, in which:

Fig. 1 is a plan view of a preferred embodiment of a press included in the apparatus of my invention, Fig. 2 is a front elevational view of the press shown in Fig. 1, parts thereof shown in section as indicated by the line 2—2 of Fig. 4.

Fig. 3 is a perspective view of one of the pressure members of the aforementioned press.

Fig. 4 is an end elevational view of aforesaid press.

Fig. 5 is a fragmentary rear elevational view of Fig. 4 taken in the direction of arrow 5.

Fig. 6 is a horizontal sectional view taken on the line 6—6 of Fig. 4.

Fig. 7 is a fragmentary horizontal sectional view taken on the line 7—7 of Fig. 4.

Fig. 8 is a fragmentary perspective view of a depressing finger embodied in said press.

Fig. 9 is a fragmentary view of a roller grab box embodied in aforesaid press and taken in the direction of the arrow 9 in Fig. 4.

Fig. 10 is a fragmentary sectional view taken on the line 10—10 of Fig. 4.

Fig. 11 is a perspective view of a packed box of oranges.

Fig. 12 is a diagrammatic fragmentary view illustrating the extent to which the side nails are driven into the box ends and middle partition when the packing box is filled with fruit and inserted in my apparatus.

Fig. 13 is a view similar to Fig. 12 showing the completion of the nailing of the sides to the ends and middle partition of the box as this is effected by my apparatus.

Referring specifically to the drawings, the combined box and cover press 15 represents the preferred embodiment of my invention and includes a cover pressing means 16 and a side pressing means 17.

The combined press 15 includes a short section of roller track 18 having angle frame members 19 and 20 upon which are mounted suitable ball bearing rollers 21. The members 19 and 20 are supported by a pair of front legs 24 and a pair of rear legs 25. The legs 25 are connected together by a transverse angle iron member 26 and the legs 25 are individually connected with the legs 24 by bolts 27 passing through compression tubes 28. Rigidly connecting the frame members 19 and 20 with the legs 24 and 25 are short metal braces 30. Connecting upper portions of the legs 24 is a longitudinal angle iron frame 31.

The press 15 also includes a vertical pair of angle iron members 35 between which is provided a cover press slide bar runway 36. The members 35 are connected at their lower ends by the transverse member 26 and at their upper ends by a plate 37 and medially to the longitudinal frame member 19. Provided on the upper ends of the angle iron members 35 are arms 40 rotatably supporting a roller 41 which is disposed tangent to the rear edge of the aforementioned slide bar runway 36. Slidably fitting in said runway is a vertical slide bar 42 having a cover depressing yoke 43 pivotally mounted on its upper end as shown, this yoke being provided with a pair of cover contact members 44. Extending forwardly from the lower end of the slide bar 42 is a lug 48.

Extending rearwardly from the lower portions of the angle iron members 35 is a pair of V-shaped plates 49 between apexes of which extends a pin 50 upon which is pivotally mounted a cover depressing lever 51. The lever 51 extends forwardly and upwardly between the vertical members 35 and during swinging movement about the pin 50 is guided upon an arcuate ratchet-toothed bar 54 which connects at its upper end to the longitudinal frame member 31 and at its lower end to a pair of rods 55 which rigidly connect to the longitudinal frame member 26.

Provided on the front end of the lever 51 is a foot plate 56. Disposed alongside this plate and pivotally mounted on a cap screw 58 which screws into a suitable opening of the lever 51 is a latch 59 having a pawl 60, the latch 59 being urged by a spring 61 so that when this latch is free the pawl 60 is pressed against the outer face of the ratchet-toothed bar 54. Secured at one end under the head of the cap screw 58 and at the other end by a screw 64 to the lever 51 is a guide bracket 65.

Pivotally connected at its opposite ends to the lever 51 and the lock 48 on the slide bar 42 is a pair of links 66.

Connected at their upper ends to lugs 70 formed at the lower edge of the plates 49, and at their lower ends to inward bent ears formed on a plate 71 attached in any suitable manner to the rear face of the slide bar 42 are long coiled tension springs 73 which yieldably support the slide bar 42, the yoke 43, and the cover depressing lever 51.

The cover pressing means 16 of the press 15 having been described, the side pressing means 17 may now be described as follows:

Secured to forward faces of the vertical frame members 35 is a short horizontal channel iron member 75 and supported on the member 75 and the longitudinal angle iron member 31 are horizontal channel iron frame members 76. Mounted in suitable bearings secured upon upper faces of the members 76 at their opposite ends are shafts 80 and 81. Rigidly secured upon shaft 80 are hubs 83 of a pair of rocker members 84 having arms 85 and 86. Pivotally mounted between extremities of the arms 86 is a heavy roller 87. Pivotally mounted on the upper end of the arms 85 is a box side engaging member 90. The member 90 includes a channel iron member 91, a face plate 92 which is substantially the same size as the complete side of a box which it is desired to press, and triangular outer and inner plates 94 and 95 which are disposed between the member 91 and the plate 92 and are welded to these so as to form a rigid assembly. Disposed between the forward ends of the plates 95 and coextensive vertically therewith is a relatively heavy reinforcing plate of metal 98 which is secured preferably by welding to the plate 92 and the plate 95. The triangular plates 94 and 95 extend slightly above the upper edge of the face plate 92 and support an upper fruit protecting guide 99 in the manner shown so that this plate projects beyond the working face of the face plate 92 a distance equal to the thickness of sides used on a box to be handled in the press 15. A center fruit protecting guide 100 is provided on the working face of the face plate 92 for a purpose to be described later.

The upper ends of the arms 85 are pivotally connected by suitable pins to triangular plates 95 and the box side engaging member 90 is held in the position in which it is shown in Fig. 4 by pins 105 provided on the arms 85 and engaging the plates 95 as shown.

Threaded through suitable openings in the vertical frame members 35 and bearing against the reinforcing plate 98 so as to form rear stops for the side engaging member 90 are bolts 106. These bolts are locked as by a wire 107 threaded through suitable holes in their heads.

The shaft 81 extends through a hub 110 of a rocker 111 having arms 112 and 113. The hub 110 is rigidly secured to the shaft 81.

Provided on corresponding ends of shafts 80 and 81 are a pair of arms 115 and 116, these arms being connected by a spring 117 tending to rotate the shafts 80 and 81 in opposite directions for a purpose to be described later.

Supported on the upper end of the arm 112 is a box side engaging member 118 which includes a channel iron member 119, a face plate 120, vertical angle iron members 121, triangular brackets 122 and 123 which are welded to the plate 120 and the member 119 so as to connect these as shown in Fig. 3. The brackets 122 and 123 are similarly formed of sheet metal to provide pockets 125 and 126, the upper end of the arm 112 extending into the pocket 126 and being pivotally connected to the bracket 123 by a pin 127. The side engaging member 118 is maintained in upright position with the rocker 111 in the position shown in Fig. 4 by a pin 130 provided on the arm 112 and engaging the bracket 123.

The angle iron members 121 and the bracket 122 extend above the upper edge of the face plate 120 and support an upper fruit guard 132 in a position as shown, this guard being disposed a distance in advance of the face plate 120 equal to the thickness of a side on a box to be handled by the press 15. Provided on the face plate 120 so as to extend inwardly therefrom horizontally along the center line thereof, is a middle fruit guard 133.

Rigidly mounted on outer faces of the vertical angle iron members 121 are roller brackets 135 carrying rollers 136 in the manner shown. Secured to the forward face of the vertical slide bar 42 just beneath the longitudinal press frame member 19 as by screws 140 is an arm depressing finger 141. The finger 141 projects over the rear end of the arm 113 which is pivotally connected to a yoke 143 provided on a pull bar 144 which extends downwardly.

Disposed against the upper and lower ends of the V-shaped plates 49 and secured thereto by the same rivets which secure these plates to the vertical members 35 is a pair of brackets 147 upon which is pivotally mounted by bolts 148 a pair of lever arms 149 which extend forward and upwardly at substantially the same angle as the lever 51 and are connected at the forward end by a pedal plate 150. The foot plate 150 is disposed just inside of and on substantially the same level as the foot plate 56. Secured to upper faces of the lever arms 149 is a guide plate 152 having fingers 153 which extend on opposite sides of the ratchet-toothed bar 54 so as to guide the lever arms 149 in their pivotal movement about the bolts 148. Engaging the guide plate 152 so as to limit the upward movement of the lever arms 149 is a stop 156 provided on the ratchet bar 54 as shown in Fig. 4. Pivotally connected at their lower ends by pins 158 to the pair of levers 149 is a pair of links 159 and 160. Carried by the links 159 and 160 is a grab clutch 161. This includes a metal head 162 formed on the upper end of the link 159 and having an inner face 163 which bears against one side of the pull bar 143. The upper end of the link 160 has a head 164 having inner face 165 which is spaced from and disposed at an angle to the opposite face of the pull bar 143.

Connecting the link heads 162 and 164 are front and rear plates 167 which are attached thereto as by suitable screws 168. Disposed between the pull bar 143 and the inclined surface 165 is a pinch roller 169 and a compression spring 170 which rests upon a floor 171 extending from the head 164 at the lower end of the surface 165 and forces the pinch roller 169 upward into snug engagement with both the pull bar 143 and the surface 165. The surface 165 is at such an angle that when the grab clutch 161 is pulled downwardly by the links 159 or 160 the grab roller 169 will bind between the surfaces 165 and the pull bar 143 and pull the bar 143 downwardly with the clutch 161, and so that when the clutch 161 is moved upwardly the pinch roller 169 will readily slide upon the adjacent surface of the bar 143. Provided on the channel frame member 75 is a bracket 172 which extends over the head 164 and has a bolt 173 adjustably provided thereon so as to extend downwardly and contact the roller 169 and move this downward so as to prevent the clutch 161 from grabbing the bar 143 while the pair of levers 149 is in upward position.

Connecting to fittings 175 mounted on the pins 158 and to the channel frame member 75 are coiled tension springs 176 which yieldably maintain the pair of levers 149 in upward position as shown in Fig. 4.

As set forth in my copending application mentioned hereinabove, the novel fruit packing method with which the press 15 is adapted to be used includes the making up of fruit boxes such as the box 180 shown in Figs. 4 and 11 so that side slats 184 and 185 of this box are loosely nailed to end pieces 182 and middle partition 183 of this box. The fruit having been packed in this box, the latter is placed in the press 15, as shown in Fig. 4, with side slats 185 resting against the side engaging member 90. When the box is thus disposed, the lower guard strip 100 extends between side slats 185, and the upper guard 99 moves in over the upper edge of the upper slat 185 to move the adjacent row of fruit in the upper tier thereof inwardly and out of contact with this edge.

The operator of the cover and side press 15 now places the lid 188 over the box 180 in the position shown and steps upon the foot pedal 56 in a manner to depress this without moving the foot plate 150. Depressing the foot pedal 56 draws down upon the vertical slide bar 42 and presses end portions of the lid 188 against the fruit in the box 180. As desired, the lid may or may not at this time be brought with its ends in actual contact with the box ends 182.

In its downward movement the slide bar 42 carries with it the depressing finger 141 which rotates the rocker 111 on its shaft 81 bringing the side engaging member 118 into contact with the side slats 184 so that the middle guard strip 133 extends between the slats 184 and the upper guard strip 132 extends inwardly along the top edge of the uppermost of these slats. This action of the upper guard strip 132 has the same effect as the positioning of the guard strip 99 above the upper slat 185 on the upper side of the box 180. In other words the outer rows of the upper tier of fruit are positively tucked inwardly by the guard members 99 and 132 so that the subsequent downward movement of the lid 188 will not pinch these outer rows of fruit against the outer edges of the upper side slats 184 and 185. With the rotation of the rocker 111 as above noted, the pull bar 144 is lowered a slight distance through the grab clutch 161. As the lever 51 swings downwardly the pawl 60 engages with teeth on the ratchet-toothed guide bar 54 and retains this lever in position when the foot is removed.

With the side engagement member 118 contacting the box side slats 184, the rollers 136 engage outer surfaces of the box ends 182 so as to prevent any tendency of expansion of these during the pressing in of the sides of the box 180.

It is desired to point out here that the adjustment screws 106 as shown in Fig. 7 are positioned so that when the foot levers 51 and 149 are in inactive position there will be sufficient space between the lower edge of the rocker arm 113 and the roller 87, journalled between the rocker arms 86, so that the depression of the foot pedal 56 sufficiently to bring the side engagement member 118 against the box side slats 184 will just bring the rocker arm 113 into contact with the roller 87.

The operator now steps upon the foot plate 150, bringing it downward with his entire weight. This moves the grab clutch 161 downwardly, pulling with it the pull bar 144 and further swinging the rocker 111 so that the side engagement member 118 presses the side slats 182 snugly against the ends and partition of the box 180, driving home the nails 186 in these slats.

As the rocker arm 113 is in contact with the roller 87 at the commencement of the down stroke of the grab clutch 161 the rockers 84 and 85 are also rotated about the shaft 80 so as to press in the side slats 185 concurrently with the pressing of the side slats 184. During the pressing in of the side slats of the box 180 the fruit is guarded against being cut by edges of these slats by the guards 99 and 100 on one side and 132 and 133 on the other side, these guards lying, as previously described, in the same vertical plane as the side slats adjacent thereto.

The foot is now removed from the pedal 150 permitting the levers 149 to swing upwardly until the bolt 173 engages the grab roller 169, disengaging the grab clutch 161 from the pull down bar 143. Urged by the spring 117, the rockers 84, 85 and 111 are rotated until the rocker arm 113 contacts the depressing finger 141 and the roller 87 engages the lower face of this rocker arm.

The pressing in of the side slats 184 and 185 drives the nails 186 into the ends and partition of the box 180 so that when the box side engagement members 90 and 118 draw away the slats 184 and 185 are left nailed tightly to the box ends and partition as shown in Figs. 11 and 13.

If the cover 188 has not previously been brought snugly against the box end 182 by depression of the foot lever 51, this may be done now and the cover nailed to the box ends by hand or by an automatic nailing machine which might easily be incorporated with the cover press 16 in a manner well known in the art.

By engaging the catch 59 with the foot and slightly depressing the pedal 50 the dog 60 can be disengaged from the ratchet-guide 54 and the lever 51 permitted to return upward to normal, thus lifting the cover depressers 44 from the cover 188 so that the box 180 is free to be shoved along the roller conveyer 18 onto a discharge conveyor (not shown) which is associated therewith. A metal strap 191 is now applied to the box in a manner shown in Fig. 11 and the box 180 is ready for shipment.

From the foregoing description of the structure and manner of operation of the press 15, it is seen to have a number of advantages over all cover presses hitherto provided by the fruit-packing art. While cover press 15 is particularly designed to include a side compressing function to permit it to be used in carrying out the novel method before mentioned, it also has important features which are adapted to be used with cover presses in general.

One of these features is the provision of the guards 99 and 132 which tuck the outer rows of the upper tier of fruit 180 inwardly within the planes of the inner faces of the side slats of the box before the lid 188 is brought forcibly downwardly against the fruit. While guards for accomplishing this which are operable entirely separate from the lid depresser have been known previously in the art, it is believed to be entirely novel in the press of my invention to actuate guards with the tucking function of the guards 99 and 132 in conjunction with a lid depressing mechanism such as that by which these guards are operated in the present press.

What I claim is:

1. In a box press the combination of: means for supporting a box filled with contents to be shipped and having a side member thereof only partially assembled upon other members of said box; means for forcing said side member inwardly relative to said other members to complete said assembly and compress said contents; and means for holding certain of said other box members to prevent lengthwise expansion of said box during said compression.

2. In a box press the combination of: means for supporting a box filled with contents to be shipped and having a side member thereof only partially assembled upon other members of said box; means for forcing said side member inwardly relative to said other members to complete said assembly and compress said contents; means for holding certain of said other box members to prevent lengthwise expansion of said box during said compression; and means for pressing a cover on said box simultaneously with said side compression.

3. In a box press the combination of: a nailing table for supporting a box overfilled with fresh farm produce and having a side member thereof only partially assembled upon transverse members of said box; means for pressing a cover onto said box to bring ends of said cover onto ends of said box and permit said cover to bulge upwardly in the middle; and means pressing said side member inwardly to complete said assembly and compress said produce.

4. In a box press the combination of: a nailing table for supporting a box overfilled with fresh farm produce and having a side member thereof only partially assembled upon transverse members of said box; means for pressing a cover onto said box to bring ends of said cover onto ends of said box and permit said cover to bulge upwardly in the middle; means pressing said side member inwardly to complete said assembly and compress said produce; and overflow gathering means on said side pressing means for gathering said produce inside of the inner face of said side member during said pressing operation.

5. In a cover press for overfilled boxes the combination of: a press table; means for gathering in the overflow over the upper edge of a side of said box; means for engaging the cover ends to press these down towards the ends of the box and leaving the middle of the cover bulging upwardly; means for actuating the aforementioned means coordinately; and box centralizing members on said gathering means and moving therewith to engage the ends of said box and centralize said box on said table.

6. In a cover press for overfilled boxes the combination of: a press table; means for gathering in the overflow over the upper edge of a side of said box; means for moving said gathering means inward; and box centralizing members on said gathering means and moving therewith to engage the ends of said box and centralize said box on said table.

7. In a cover pressing device the combination of: a nailing table adapted to receive a box; cover pressing means adapted to engage opposite ends of a cover placed over said box; means for causing relative vertical movement between said table and said cover pressing means to press said cover onto said box in position for nailing thereto; a gathering member adapted to move inwardly into a position closely overlying a side wall of said box to shift overflow inward from overlapping relation with said wall, said gathering member extending longitudinally at one side of the position of said box on said table and being pivotally mounted for movement toward and away from said box; and means for automatically operating said gathering member as aforesaid in timely relation with said vertical movement.

8. In a cover pressing device the combination of: a nailing table adapted to receive a box; cover pressing means adapted to engage opposite ends of a cover placed over said box; means for causing relative vertical movement between said table and said cover pressing means to press said cover onto said box in position for nailing thereto; a gathering member adapted to move inwardly into a position closely overlying a side wall of said box to shift overflow inward from overlapping relation with said wall, said gathering member extending longitudinally at one side of the position of said box on said table substantially the full length of said box, and being pivotally mounted on said table for movement toward and away from said box; and means for automatically operating said gathering member as aforesaid in timely relation with said vertical movement.

9. In a cover pressing device the combination of: a nailing table adapted to receive a box; cover pressing means mounted to engage opposite ends of a cover placed over said box; means for causing relative vertical movement between said table and said cover pressing means to press said cover onto said box in position for nailing thereto; a gathering member mounted below the plane of that portion of the pressing means in engagement with the cover for movement inwardly to shift produce overlying a wall of said box bodily and completely inwardly from over said wall, said gathering member, while engaging the produce in said gathering operation, travelling along a substantially horizontal path disposed a close distance above said vertical wall and with not more than a relatively slight vertical movement relative to said box; and means for automatically actuating said gathering member as aforesaid, in timely relation with said vertical movement so that the gathering movement of said gathering member is completed before the lid is brought forcibly downwardly against the produce.

10. In a cover pressing device the combination of: a nailing table adapted to receive a box; cover pressing means mounted to engage opposite ends of a cover placed over said box; means for causing relative vertical movement between said table and said cover pressing means to press said cover onto said box in position for nailing thereto; a gathering member initially positioned substantially in the plane of the upper edge of the side walls of the box and mounted for movement inwardly in a substantially horizontal path to shift produce overlying a wall of said box bodily and completely inwardly from over said wall, said gathering member, while engaging the produce in said gathering operation, traveling along a substantially horizontal path disposed a close distance above said vertical wall and with not more than a relatively slight vertical movement relative to said box; and means for automatically actuating said gathering member as aforesaid, in timely relation with said vertical movement so that the gathering movement of said gathering member is completed before the lid is brought forcibly downwardly against the produce.

11. In a cover pressing device the combination of: a nailing table adapted to receive a box; cover pressing means mounted to engage opposite ends of a cover placed over said box; means for causing relative vertical movement between said table and said cover pressing means to press said cover onto said box in position for nailing thereto; a gathering member mouted for movement inwardly to engage produce overlying a wall of said box and shift said produce bodily and completely inwardly from over said wall, said gathering member, while engaging the produce in said gathering operation, traveling along a substantially horizontal path extending inwardly over said vertical wall a close distance thereabove, said gathering member while engaging said produce, having not more than a relatively slight vertical movement relative to said box and in its inwardmost position entirely overlying said wall; and means for automatically actuating said gathering member as aforesaid, in timely relation with said vertical movement so that the gathering movement of said gathering member is completed before the lid is brought forcibly downwardly against the produce.

EDWARD F. MEER.